United States Patent

[11] 3,559,694

| [72] | Inventor | Fred J. Volberg<br>Lafayette, Calif. |
|---|---|---|
| [21] | Appl. No. | 815,877 |
| [22] | Filed | Apr. 14, 1969 |
| [45] | Patented | Feb. 2, 1971 |
| [73] | Assignee | Associated Insulation of California<br>Richmond, Va.<br>a corporation of California |

[54] REMOVABLE INSULATED FITTING FOR PIPE JOINTS
8 Claims, 8 Drawing Figs.

[52] U.S. Cl. .................................................. 138, 147
138/149, 161/109, 161/213; 285/47
[51] Int. Cl. .................................................. F16l 59/16
[50] Field of Search ........................................ 161/48, 49,
109, 115, 213; 285/47; 138/147, 149

[56] References Cited
UNITED STATES PATENTS

| 754,256 | 3/1904 | Sullivan ........................ | 285/47 |
| 1,108,840 | 8/1914 | Franke ......................... | 285/47X |
| 2,390,632 | 12/1945 | Abrams et al ................. | 285/47 |
| 3,153,546 | 10/1964 | Dunn ............................ | 285/47X |

*Primary Examiner*—Harold Ansher
*Assistant Examiner*—W. E. Hoag
*Attorney*—Owen, Wickersham & Erickson

ABSTRACT: A removable insulation unit for surrounding pipe joints, particularly at fittings such as elbows, tees and the like comprises a pair of relatively thin outer shells which are connectable by fastener means to form a cylindrical cover. An insulation liner surrounded by a perforated member is secured within each shell member by hook members that extend inwardly from its inner wall.

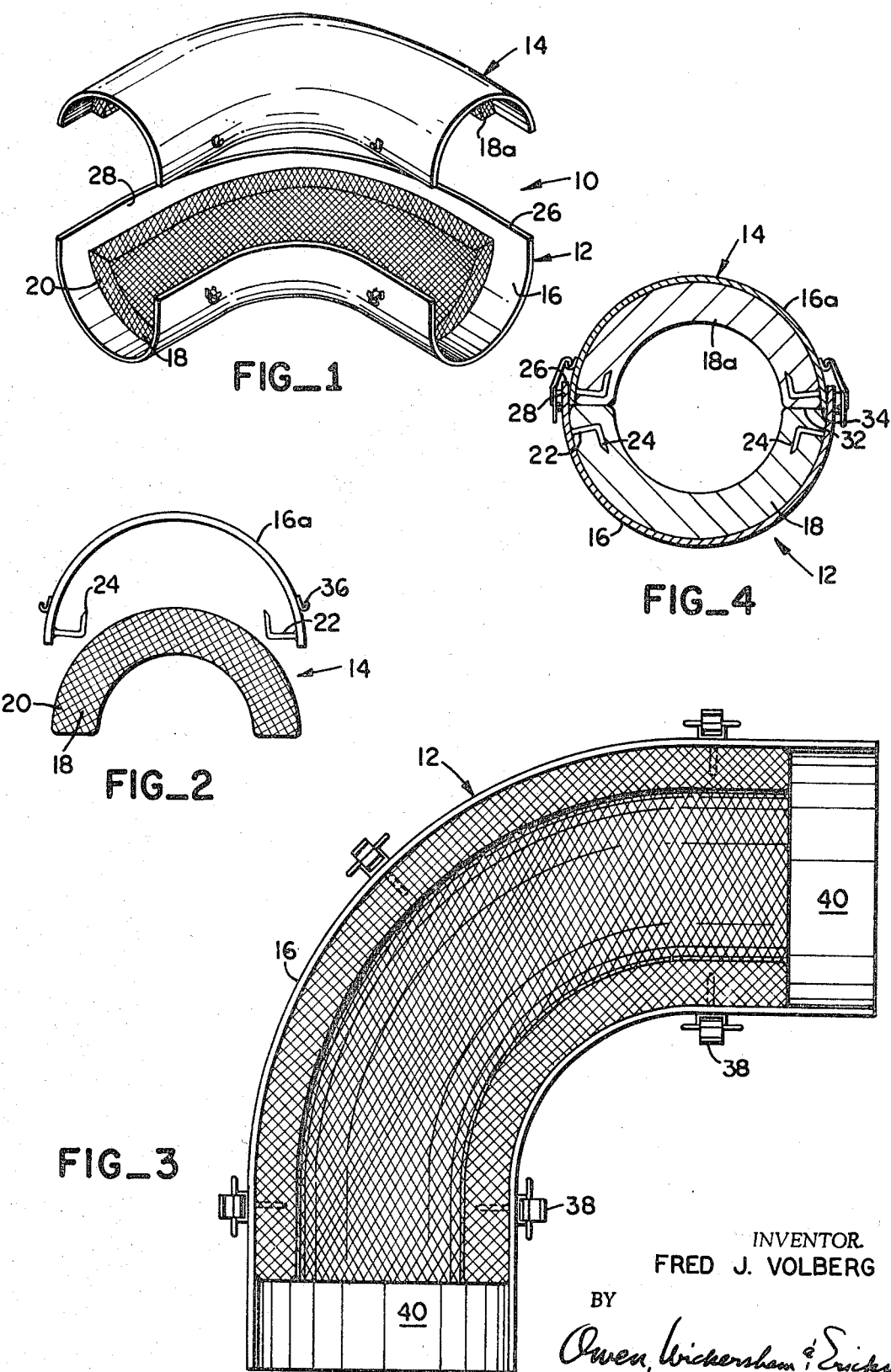

3,559,694
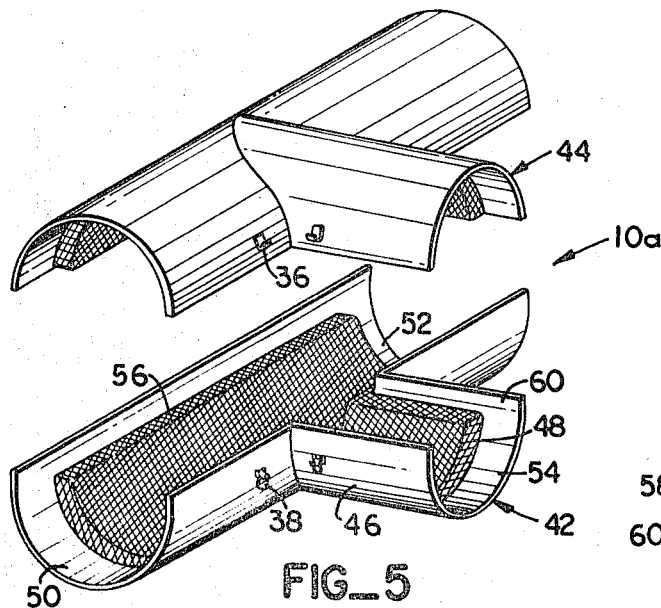
FIG_5
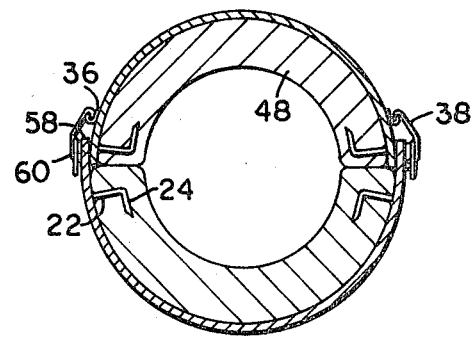
FIG_8
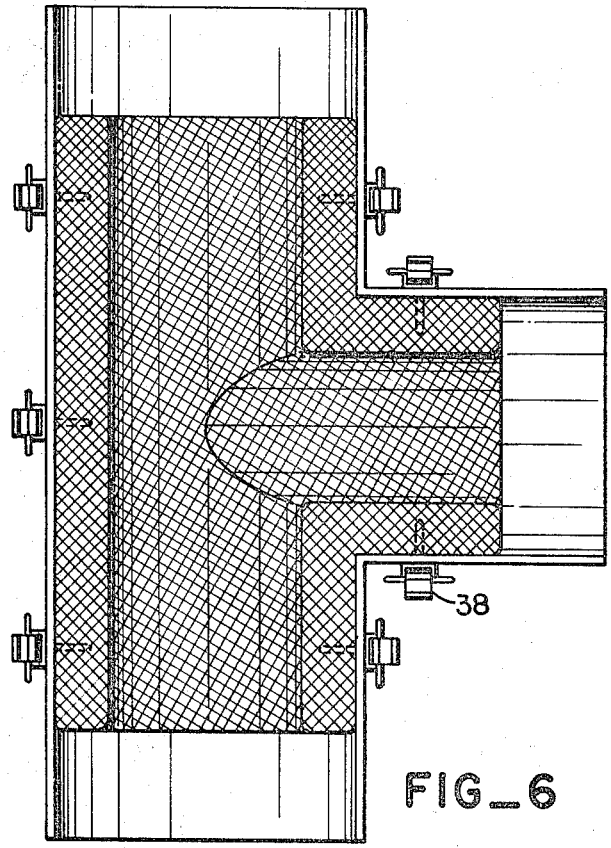
FIG_6
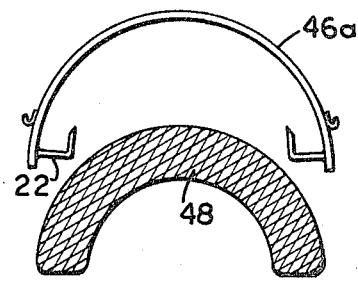
FIG_7
*INVENTOR.*
FRED J. VOLBERG
BY
Owen, Wickersham & Erickson
ATTORNEYS

REMOVABLE INSULATED FITTING FOR PIPE JOINTS

This invention relates to the insulation of pipes or conduits and more particularly to an improved metal jacketed insulation device that is easily removable to facilitate inspection of the pipe joints.

Conduit systems which carry fluids at extreme temperatures require some form of insulation around the conduit to prevent heat loss or gain. In many instances, the insulation can be attached permanently and need not be removed. However, in certain conduit systems, particularly where the pipe joints are welded, it is necessary to remove the insulation periodically in order to inspect the pipe joints for corrosion or leakage. Heretofore, this procedure required the insulation previously installed to be torn apart and replaced with new insulation when the inspection or repair was completed. This was not only wasteful of material, but extremely expensive in time and labor.

Prior to the present invention attempts were made to solve the aforesaid problem by providing insulation devices that could be removed from and replaced on the conduit. Such devices generally comprised a relatively thin outer shell surrounding a thicker layer of insulation material that fit against the pipe. One problem which arose with previous units was that of securing the insulation material within the shell and this was particularly severe for insulation fittings at irregular shaped joints in the conduit such as elbows or tees. For example, many desirable insulation materials are fibrous and lack cohesive strength unless molded by an expensive process in a binder. Thus, the difficulty was both in holding the material together and in the proper shape and thickness as well as securing it within the walls of the outer shell or jacket.

A general object of the present invention is to solve this problem and provide an improved insulation unit for pipes or conduits in which a rigid metal jacket will retain an inner insulation member.

Another object of the present invention is to provide an insulation unit for use around joints on pipe fittings that is particularly easy to install and remove when inspection is required and yet which is highly effective in providing the insulation efficiency required.

Another object of my invention is to provide an insulation unit that is particularly well adapted for ease and economy of manufacture.

A more specific object of the present invention is to provide an insulation unit in which a flexible insulation liner is retained within each of a pair of outer, rigid shells by retaining members fixed to the inner walls of the shells which cooperate with a perforated covering layer around the insulation material.

Yet another object of my invention is to provide a prefabricated, removable insulation unit for pipe fittings which will not create any gaps or openings when the two half-sections of the unit are assembled and latched together.

Another object of my invention is to provide an insulation unit for pipe fittings which can utilize a wide variety of insulation materials which are retained within a perforated or meshlike covering layer.

Other objects, advantages and features of my invention will become apparent from the following detailed description taken in conjunction with the drawing, in which:

FIG. 1 is an exploded view in perspective showing an elbow shaped insulation unit embodying the principles of the present invention;

FIG. 2 is an exploded end view of one half-section of the insulation unit of FIG. 1 before the insulation liner has been installed;

FIG. 3 is a plan view of one half-section of the insulation unit with the liner installed;

FIG. 4 is a view in cross section of the unit of FIG. 1 after being fully assembled;

FIG. 5 is an exploded view in perspective showing a "tee" shaped insulation unit according to my invention;

FIG. 6 is a plan view of one half-section of the unit shown in FIG. 5;

FIG. 7 is an exploded end view of one half-section of the unit of FIG. 5 before the insulation liner is installed; and FIG. 8 is a view in cross section of the insulation unit of FIG. 5.

Referring to the drawing, FIG. 1 shows an insulation unit 10 embodying the principles of my invention which is adapted to be installed around an elbow shaped pipe fitting that requires insulation. Generally, the unit comprises a pair of substantially identical half-sections 12 and 14 which fit together to form the complete unit. The bottom half-section comprises an outer shell member 16, preferably of sheet metal and having a curved shape in planform and semicircular cross section. Within the outer shell is a relatively thick insulation liner 18 comprised of a suitable insulation material such as rock wool, asbestos or mineral fiber, glass fiber or other materials and shaped to fit the inside of the shell in a substantially uniform layer. Surrounding the insulation material is a perforated covering 20 such as a flexible metal screen or mesh material. Both the insulation layer and the perforated covering or wire mesh has the required curved shape of the elbow. That is, the inside diameter of the insulation layer and the metal mesh on its surface have an inside diameter approximately equal to the outside diameter of the pipe on which the unit is to be installed. The outer diameter of the insulation layer 18 and its adjacent covering 20 is equal to the inside diameter of the outer metal shell 16. The webbing, as shown, follows the semicylindrical shape of the insulation layer and is secured thereto by any suitable means such as metal clips or the like (not shown). The metal webbing is preferably made of a light, flexible stainless steel wire having a uniform mesh (e.g. one-eighth inch) and serves a vital function in my invention. As shown in FIG. 2, the outer rigid half-shell 16 of the unit 10 is provided with a series of internal hook members 22 which are fixed to and extend inwardly from the inner side walls of the shell at predetermined intervals. The hook members each have end portions 24 that are bent relative to their shank in a direction away from the edges 26 of the shell. Thus, the insulation liner 18 with its metal mesh exterior 20 is installed, as shown in FIG. 2, by pushing it forcefully into the shell member. When this occurs, the hook members 22 penetrate through the wire mesh and become buried in the insulation material. Once installed in this manner, the hook members in cooperation with the wire mesh covering 20 hold the insulation material firmly in place, as shown in FIG. 3. In the embodiment of my insulation unit shown, the lower shell section 12 is slightly different from the upper shell section 14, in that the lower shell is somewhat larger in diameter and has outer edge portions 28 that extend beyond the edges of the insulation liner 18. Thus, as shown in FIG. 4, in the upper half-section 14 the insulation liner 18a and its outer shell 16a have edges 32 and 34 on both sides that are flush all along the entire length of the section 14.

When the two half-sections 12 and 14 are joined together the upper half-section fits inside the outer edge portions 28 of the lower half-section with the edges of the insulation liners 18 and 18a in abutment along the full length of the unit. Spaced apart along the outside of the upper and lower sections are a series of matching retaining members for holding the two sections together around a pipe. These retaining members may be of any suitable type. For example, as shown, I may provide hook members 36 on the exterior of the upper half-section and for each hook member a loop type pivotal latching member 38 is provided on the lower half-section.

When the unit 10 is installed, the insulation liner 18 is long enough to cover completely any weldment that normally connects the pipe elbow to its adjoining straight sections. Of course, the elbow may be extended at each end of any length desired. The semicircular end portions 40 of both outer shells 16 and 16a of my insulation unit extend beyond the insulation layers 18 and 18a and thus are able to overlap the end portion of the conventional insulation on the straight pipe sections adjoining the pipe elbow on which the unit 10 is installed. To install the elbow unit 10, the two half-sections 12 and 14 are merely placed in position and then locked in place by latching the retaining members 38 on the hooks 36.

In FIGS. 5—8 a "tee" shaped unit 10a is shown which embodies the principles of my invention. As with the previous embodiment, this unit also comprises a lower half-section 42 and an upper half-section 44 which are similarly shaped and connectable together when in place around a "tee" shaped fitting in a pipe conduit. The lower half-section 42 is comprised of a sheet metal outer shell 46 having the conventional "tee" shape with a main body portion from which extends a side branch portion. Secured within the lower half-shell 46 is an insulation liner 48 having a generally uniform thickness and the same "tee" shaped configuration. However, at both ends of the main body portion and the side branch portion of the shell are end portions 50, 52 and 54 that extend beyond the ends of the insulation liner 48. The insulation member, as previously described, may be of any suitable insulating material and is covered with a wire mesh layer 56 which is attached so that it closely follows the contour of all surfaces on the insulation material. The shell 46 is provided with hook members 22, as described in the previous embodiment and, as shown in FIG. 6, these hook members are spaced inwardly from the side edges 58 of the shell. Preferably, at least five hooks are provided for the main portion of the insulation unit and two hooks are provided for the side branch portion. The insulation liner 48 covered with its wire mesh is installed within its shell by merely forcing it into place, as shown in FIG. 7.

The upper half-section 44 is constructed in the same manner as the lower half-section 42. It is provided with an insulation liner 48 and an outer shell 46a that has the same general shape as the lower shell 46. However, the maximum diameter of the upper section 44 is slightly less than the lower half-section 42 so that it will fit within and be overlapped by extended edge portions 60 that are provided on the lower shell 46 when the unit 10a is installed.

When both of the half-sections of the unit 10a are installed, the insulation liners 48 abut along longitudinal lines completely surrounding the pipe, and are held together by latch members 36 and 38 as previously described. The overlapping edge portions 60 of the lower shell eliminate any possibility of a gap or opening between the connected shell sections. When it is necessary to remove the insulation unit 10a to inspect the pipe joints at the pipe fitting the two sections 42 and 44 may be separated easily be releasing the latch members. If, for some reason, the insulation liners must be replaced they too can be easily removed by releasing them from the hook members within the shells.

It will be seen from the foregoing that the present invention provides a highly efficient and versatile, yet low cost removable insulation unit for pipe joints. While specific embodiments have been shown for elbow and tee shaped joints, the invention may also be applied to other types or shapes of joints.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A removable insulation unit for a pipe fitting comprising:

first and second rigid shells each having the same general configuration and a generally semicircular shape in cross section;

a liner member within each said shell comprised of insulation material and an enveloping layer of flexible, perforated material attached thereto;

means on the inside of each of said shells extending through said perforated material for retaining a said liner member in place; and means on the outside of both said shells for holding them together around a pipe fitting.

2. The insulation unit as described in claim 1 wherein said first shell includes longitudinal edge portions that extend beyond the longitudinal edges of its liner member and overlap said second shell when the two shells are assembled as on a pipe fitting.

3. The insulation unit as described in claim 1 including end portions on each of said shells that extend beyond the ends of each liner member and thereby are adapted to overlap insulation around pipe sections connected to the pipe fitting that is covered by said unit.

4. The insulation unit as described in claim 1 wherein said first and second shells and said liner members therein have a curved shape whereby the insulation unit is adapted for application to a pipe elbow.

5. The insulation unit as described in claim 1 wherein said first and second shells and said liner members therein have a "tee" shape.

6. The insulation unit as described in claim 1 wherein said means on the inside of each said shell comprises a plurality of hook members.

7. The insulation unit as described in claim 1 wherein said flexible perforated material is a stainless steel wire mesh.

8. The insulation unit as described in claim 1 wherein said means on the outside of said shells for holding them together comprises hook members located at spaced apart intervals on one of said shells and a cooperating latching member for each said hook member pivotally attached to the other shell.